(12) United States Patent
Chen et al.

(10) Patent No.: US 6,789,998 B2
(45) Date of Patent: Sep. 14, 2004

(54) APERIODIC STRUTS FOR ENHANCED BLADE RESPONSES

(75) Inventors: Robert P. Chen, Torrance, CA (US); Sasha M. Ablitt, Hermosa Beach, CA (US); Ramesh C. Doshi, La Palma, CA (US)

(73) Assignee: Honeywell International Inc., Morristown, NJ (US)

( * ) Notice: Subject to any disclaimer, the term of this patent is extended or adjusted under 35 U.S.C. 154(b) by 73 days.

(21) Appl. No.: 10/236,791

(22) Filed: Sep. 6, 2002

(65) Prior Publication Data

US 2004/0047722 A1 Mar. 11, 2004

(51) Int. Cl.[7] .............................................. F01D 25/04
(52) U.S. Cl. ..................... 415/1; 415/119; 415/208.2; 415/220
(58) Field of Search .................... 415/1, 119, 185, 415/191, 195, 208.2, 220; 417/312

(56) References Cited

U.S. PATENT DOCUMENTS

| | | | |
|---|---|---|---|
| 1,534,721 A | * | 4/1925 | Fritz ........................ 415/195 |
| 3,006,603 A | | 10/1961 | Caruso et al. |
| 3,169,747 A | | 2/1965 | Seymour |
| 3,471,080 A | * | 10/1969 | Gray ........................ 415/119 |
| 3,601,876 A | | 8/1971 | Vogt |
| 4,253,800 A | | 3/1981 | Segawa et al. |
| 4,482,302 A | * | 11/1984 | Grignon ..................... 415/220 |
| 4,729,714 A | * | 3/1988 | Wrobel ...................... 415/119 |
| 5,000,660 A | | 3/1991 | Van Houten et al. |
| 5,266,007 A | | 11/1993 | Bushnell et al. |
| 5,299,763 A | | 4/1994 | Bescoby et al. |
| 5,302,081 A | | 4/1994 | Smith |
| 5,442,905 A | | 8/1995 | Claeys et al. |
| 5,681,145 A | | 10/1997 | Neely et al. |
| 5,709,103 A | | 1/1998 | Williams |
| 5,899,085 A | | 5/1999 | Williams |
| 6,139,259 A | | 10/2000 | Ho et al. |
| 6,139,275 A | | 10/2000 | Noda et al. |
| 6,379,112 B1 | | 4/2002 | Montgomery |
| 6,386,830 B1 | | 5/2002 | Slipper et al. |
| 6,439,838 B1 | * | 8/2002 | Crall et al. .................. 415/119 |

FOREIGN PATENT DOCUMENTS

| | | | | |
|---|---|---|---|---|
| DE | 2204507 A | * | 8/1973 | ................. 415/220 |
| DE | 19638518 | | 4/1998 | |
| EP | 1 111 191 A2 | | 6/2001 | |
| JP | 6-280792 A | * | 10/1994 | ................. 415/119 |

OTHER PUBLICATIONS

International Search Report, Jan. 7, 2004.
Chen et al., "Aeroelastic Analysis of an Axial–Flow Fan for the Next Generation Airliner", America Institute of Aeronautics & Astronautics (AIAA), Symposium on Multidisciplinary Analysis and Optimization, 8th, Sept. 6–8, 2000, pp. 1–10, Long Beach, CA.

* cited by examiner

Primary Examiner—Christopher Verdier
(74) Attorney, Agent, or Firm—Oral Caglar, Esq.

(57) ABSTRACT

A system and method for reducing blade strain on the fan blades of an air cycle machine is proposed. The method involves a strut arrangement that is positioned in a cylindrical air passage upstream from the fan assembly. The strut arrangement includes at least three struts, wherein the at least three struts are separated by unequal degrees of separation along the circumference of the air passage. The strut arrangement effectively reduces the strain on the blades of the fan assembly.

24 Claims, 6 Drawing Sheets

APERIODIC STRUTS FOR ENHANCED BLADE RESPONSES

BACKGROUND OF THE INVENTION

The present invention generally relates to apparatus and methods of strut placement which reduces input forces on a fan. More specifically, the present invention relates to apparatus and methods of unequally spaced struts upstream from a fan where the unequally spaced struts reduce strain levels on the rotor blades of the fan.

Fan assemblies are used in many different applications. Fans are principally utilized for the movement of air for cooling or propulsion purposes, i.e. heat exchanger, air conditioning, vehicle cooling systems, ventilation and turbine engines. Fans typically consist of a hub and rotor blades where air moves through the rotor blades as the fan rotates in a circular motion. Under operation, rotor blades are subjected to various excitation forces which may vary based upon speed of operation and aerodynamic wakes that are created due to the modified air flow through the fan by any upstream struts that may be in place. Due to the excitation forces, vibratory stress and strain are developed in the blades during operation.

One method of reducing forces exerted on fan blades during operation is to place struts many chord-lengths upstream of the fan in order to smooth out the always present aerodynamic wakes. The placement of struts upstream from the fan usually include that the struts be equally spaced around the circumference of an air passage upstream from the fan. The equally spaced struts affect a fundamental excitation or forcing frequency, also known as a wake passing frequency. The wake passing frequency is the product of the total number of struts and the speed of rotation of the fan. If the wake passing frequency matches a natural resonant frequency of the blades, the blades can be driven to relatively high vibratory stress and strain which adversely affects the fatigue life of the blades. The placement of the struts upstream from the fan helps to minimize the resonant response of the fan blades and helps to ensure the avoidance of resonant crossing. Although this technique assists in reducing aerodynamic wakes and thus limits the vibratory stress and strain on the rotor blades, low excitation orders remain troublesome due to the low number of struts and the first few natural frequencies might interfere during operation. The low excitation orders place additional strain on the rotor blades and increase the likelihood of premature fatigue failure of the rotor blades.

As can be seen, there is a need for an improved apparatus and method to address low excitation orders and reduce their effect on rotor blades during operation. By reducing or eliminating potential low excitation order wakes, the vibratory stress and strain levels encountered by the rotor blades may be substantially reduced.

SUMMARY OF THE INVENTION

In one aspect of the present invention, a method of strut placement in relation to a fan assembly comprises positioning a strut arrangement in a cylindrical air passage upstream from the fan assembly, where the strut arrangement includes at least three struts; placing the at least three struts along the circumference of the air passage; and separating the at least three struts by unequal degrees of separation.

In another aspect of the present invention, a system for an air cycle machine which comprises a fan assembly; a strut arrangement, where the strut arrangement includes at least three struts, the strut arrangement is positioned upstream from the fan assembly; and a cylindrical air passage, wherein the at least three struts are separated by unequal degrees of separation along the circumference of the air passage.

In another aspect of the present invention, a strut arrangement for an air cycle machine which comprises a cylindrical air passage; and at least three struts position along the circumference of the air passage upstream from a fan assembly, wherein the at least three struts are separated by unequal degrees of separation.

In another aspect of the present invention, a method of strut placement in relation to a fan assembly comprises positioning a strut arrangement in a cylindrical air passage upstream from the fan assembly, where the strut arrangement includes three struts; placing the three struts along the circumference of the air passage; and separating the at least three struts by three unequal degrees of separation.

In another aspect of the present invention, a system for an air cycle machine which comprises a fan assembly; a strut arrangement, where the strut arrangement includes three struts, the strut arrangement is positioned upstream from the fan assembly; and a cylindrical air passage, wherein the strut arrangement lies within the air passage and the three struts are separated by unequal degrees of separation along the circumference of the air passage.

In another aspect of the present invention, a strut arrangement for an air cycle machine which comprises a cylindrical air passage; and three struts positioned along the circumference of the air passage upstream from a fan assembly, wherein the three struts are separated by unequal degrees of separation These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a strut arrangement for an air cycle machine that may include at least three struts positioned along the circumference of a cylindrical air passage upstream from a fan assembly, wherein the at least three struts are separated by unequal angles of separation. The separation of the struts by unequal angles of separation may reduce or eliminate low excitation order wakes that occur during operation of the fan assembly. In the prior art, struts are evenly spaced around the circumference of the air passage. Evenly and sparsely spaced struts reduce aerodynamic wakes in general, however the low excitation order wakes remain troublesome when the struts are upstream and the air flow has to turn sharply 180 20 before reaching the blades. The present invention may reduce or eliminate the occurrence of low excitation order wakes. The reduction or elimination of low excitation order wakes reduces the strain placed upon the fan blades of the fan assembly during operation. The reduced strain placed upon the fan blades increases their lifecycle and decreases the likelihood of failure during operation.

Figure 1:
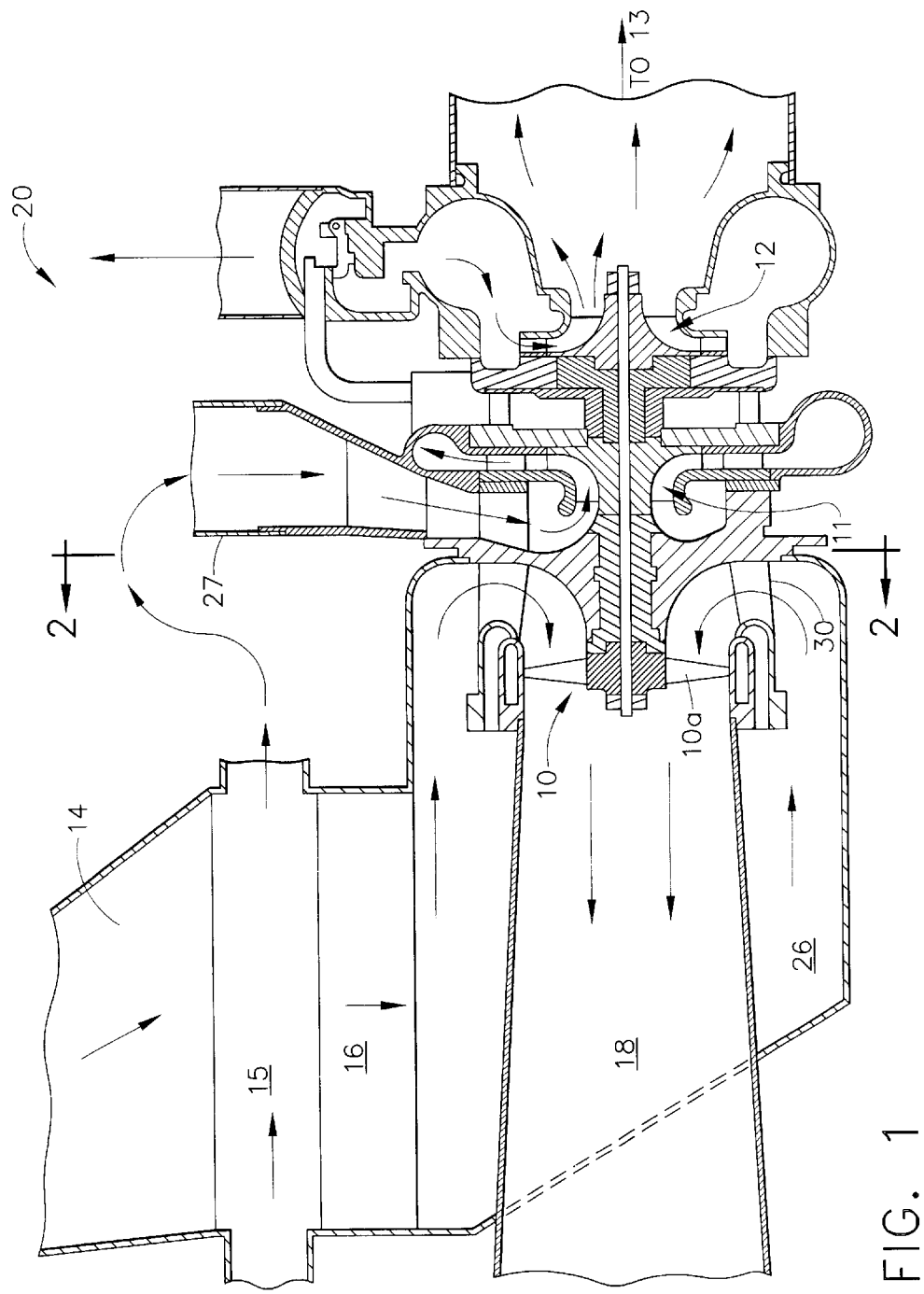
FIG. 1 shows a cross sectional view of an exemplary environmental control system.

Referring to FIG. 1, a cross sectional view of an exemplary environmental control system (ECS) is shown. The ECS receives cold ambient air through a ram air inlet 14. The cold ambient air travels in the direction of the arrows through a heat exchanger 15 which cools the hot bleed air from the main engines. The cooled bleed air flows through the compressor/turbine sections of an Air Cycle Machine (ACM) 20 to provide the conditioned air for a cabin 13. A fan 10 pulls the cold ambient air turned warm cold ambient air through the heat exchanger 15 and duct 16 to be dumped overboard. The ACM 20 directs the cooled bleed air into a compressor 11 which compresses the cooled bleed air to a higher pressure and temperature. This air is sent to the turbine 12 to be adiabatically expanded to near 65° F. to provide the conditioned air for the cabin 13, an enclosed environment. The ACM 20 includes the fan 10 with its blades 10a that push the warm cold ambient air through a diffuser 18 to be dumped overboard. The rotor blades 10a rotate at speeds up to and above 53,000 rpm. During operation, the rotor blades 10a are subjected to strains of up to 1200 micro-in/in and above. The strain on the rotor blades 10a varies at different points on the blades where the strains are caused by the sum of air flow and wake through rotor blades 10a. FIG. 1 also shows an exemplary strut 30 and compressor inlet 27, which will be described in more detail below as shown in FIG. 2.

Figure 2:
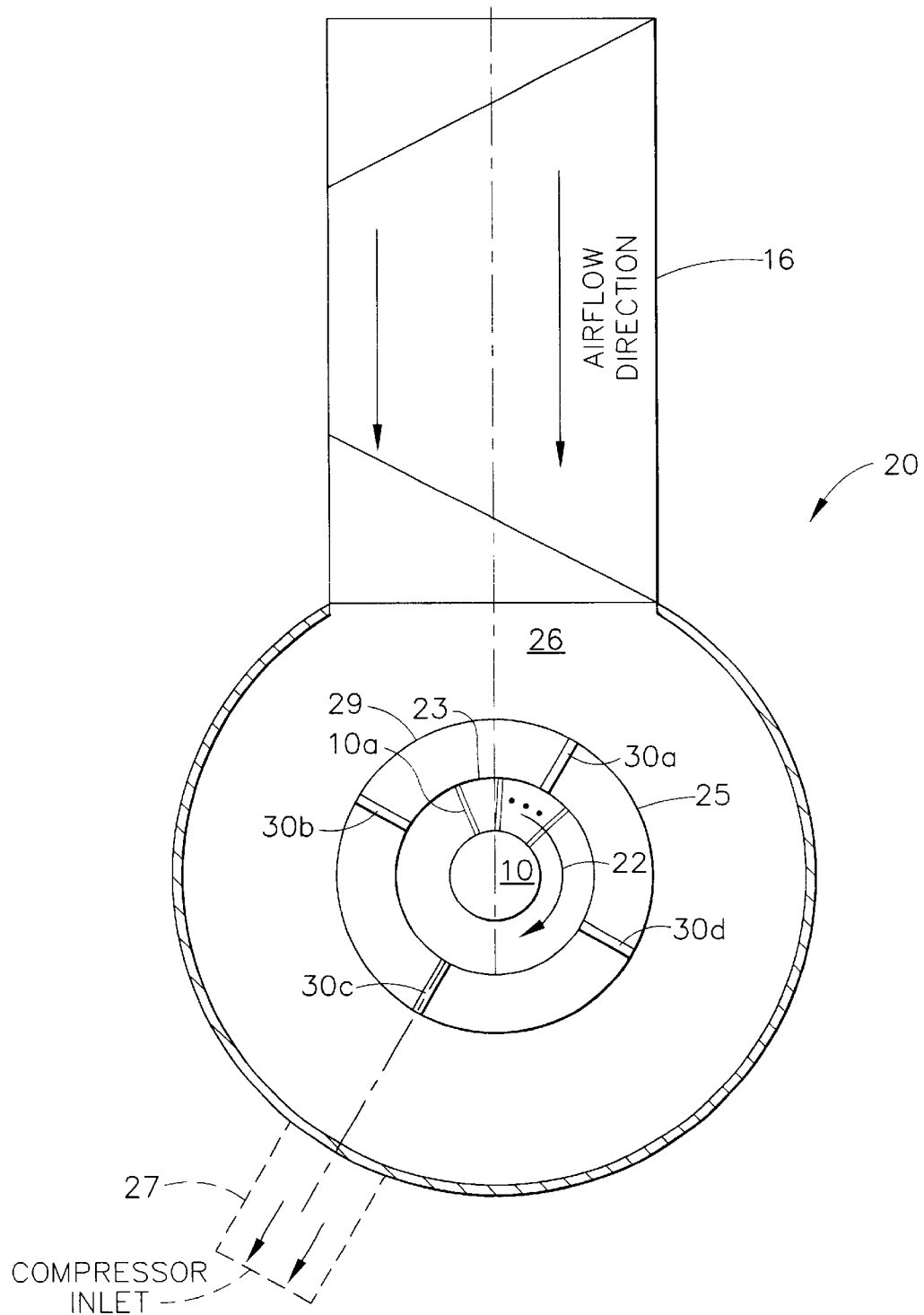
FIG. 2 shows a front sectional view of an exemplary air cycle machine.

Referring to FIG. 2, an exemplary front sectional view of an ACM 20 is shown. The sectional view of FIG. 2 shows a section of the ACM 20 downstream of and including fan 10. The arrow 22 shows the rotation of the ACM 20 which correlates with rotation of rotor blades 10a, shown in FIGS. 1 and 2. Air flows from the heat exchanger 15 shown in FIG. 1, through air duct 16 and initially the air travels into a plenum 26 that is enclosed by outer wall 28. The air travels through plenum 26 prior to moving down stream through the fan 10. The fan 10 discharges the warm cold ambient air overboard. The space between first inner wall 25 and second inner wall 23 creates an air passage 29. The air passage 29 receives the warm cold ambient air from the plenum 26. Prior art struts 30a–30d are attached between first inner wall 25 and second inner wall 23 in the air passage 29. The struts located in the air passage 29 serve as the supports for the plenum, and assist in straightening the 180° turned air through the ACM 20's fan 10.

FIG. 2 shows struts 30a, 30b, 30c and 30d positioned according to the prior art. In general, the struts are evenly spaced and therefore subject to low excitation order wakes (i.e., 3/rev, 4/rev and 5/rev). The equally spaced struts are generally positioned 360°/n apart, where n=the number of struts. FIG. 2 shows the struts 30a, 30b, 30c and 30d, as being 90° apart. Although any number of struts may be used, typically less than 6, preferably 4 struts, are positioned along the circumference of second inner wall 23.

Figure 3:
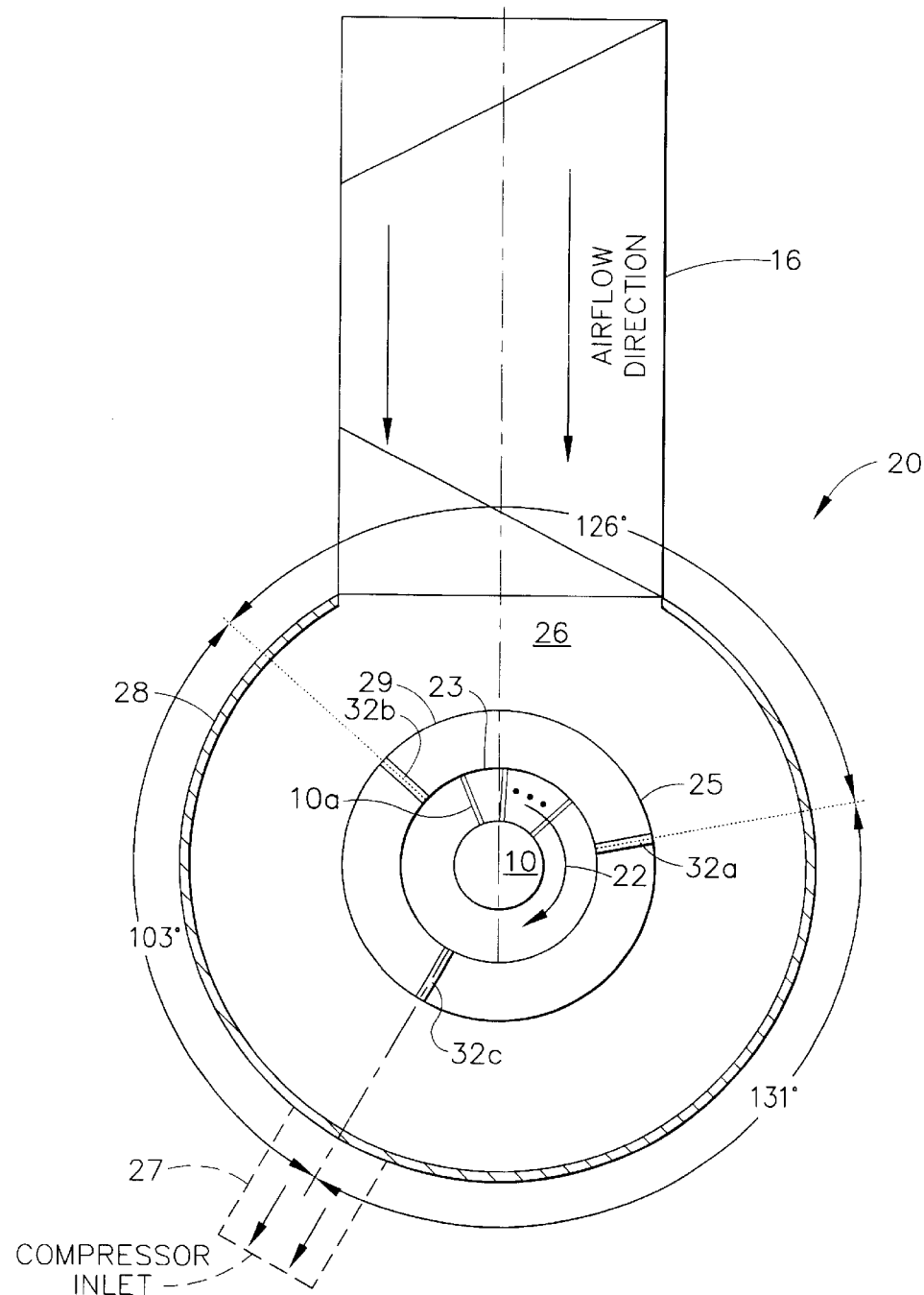
FIG. 3 shows an alternative strut arrangement, according to embodiments of the invention.
Figure 4:
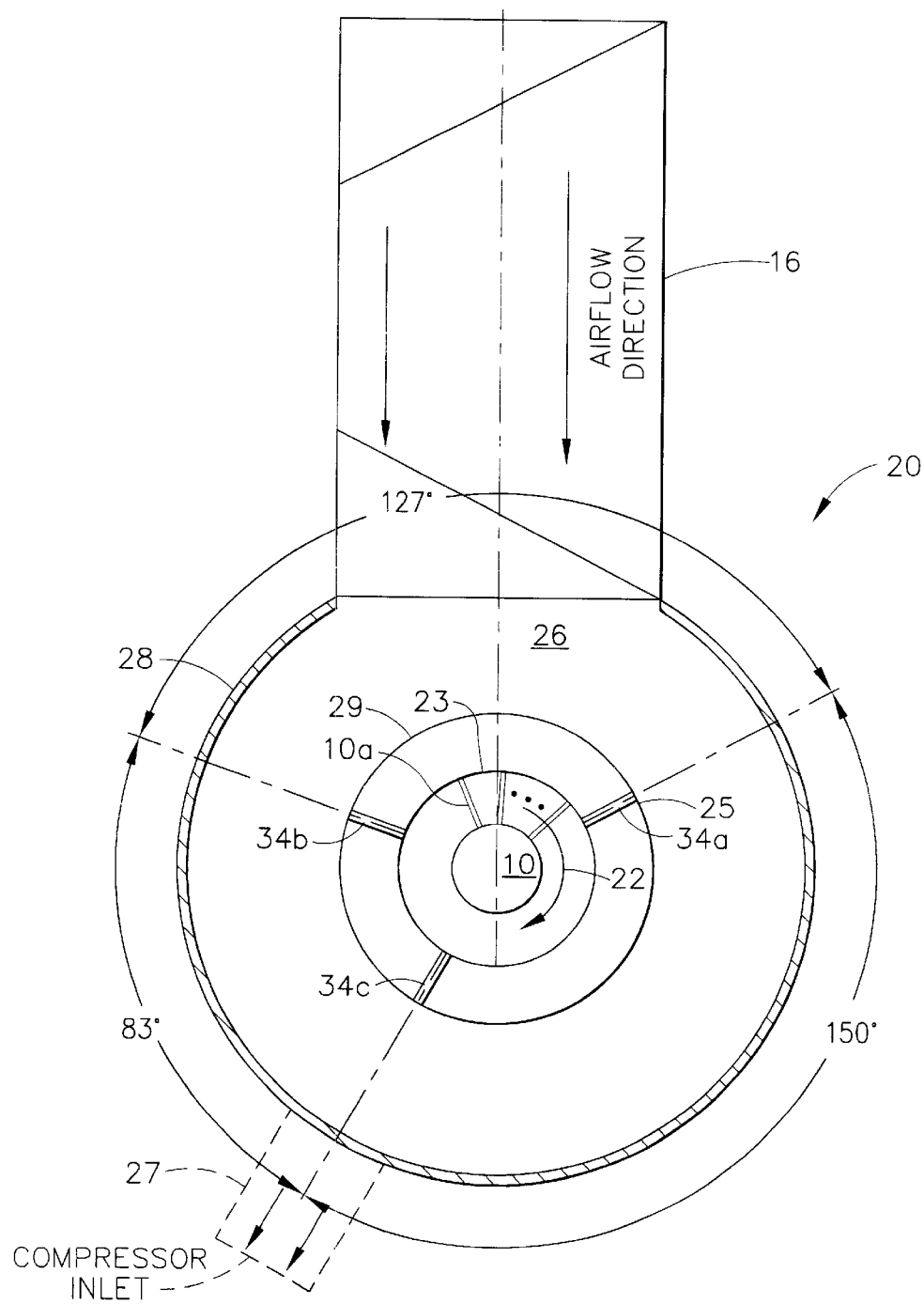
FIG. 4 shows another alternative strut arrangement, according to embodiments of the invention.

FIGS. 3 and 4 show struts arranged according to embodiments of the present invention. Three struts may be positioned between first inner wall 25 and second inner wall 23. According to FIG. 3, struts 32a, 32b and 32c may be unequally spaced about the circumference of second inner wall 23. Struts 32a and 32b may have a 126° angle of separation; struts 32b and 32c may have a 103° angle of separation; and struts 32a and 32c may have a 131° angle of separation. The present invention may use an odd number of struts positioned between second inner wall 23 and first inner wall 25. Notice that the magnitudes of two of the angles of separation may be prime numbers, an integer P divisible by only 1 and P, and the remaining angle of separation is derived by subtracting these two angles of separation from 360°. Three unequally spaced struts may be used for the present invention, however any odd or even number of struts may be used. The magnitude of each of the n−1 angles of separation may be any prime number, where n=the number of struts and the remaining angle of separation is derived by subtracting the sum of the n−1 angles of separation from 360°. The even number struts option has a further advantage that all n angles of separation may be prime numbers. Nevertheless n−1 prime numbers may be used in order to ease of the manufacturing tolerances. The unequal spacing of the struts as set forth above may reduce the input forcing function amplitudes from aerodynamic wakes, because this arrangement requires a large number of Fourier coefficients to simulate the circumferencial pressure distribution, and therefore must reduce the amplitudes of the leading low order terms. The present invention may significantly reduce low excitation orders from their true aperiodic nature. The reduction of the input forcing functions may result in reduced strain on the rotor blades 10a. Another embodiment of struts 34a, 34b and 34c according to an embodiment of the present invention is given in FIG. 4. According to this embodiment, strut 34a and strut 34b may have a 127° angle of separation; strut 34b and strut 34c may have an 83° angle of separation; and strut 34c and strut 34a may have a 150° angle of separation.

Figure 5:
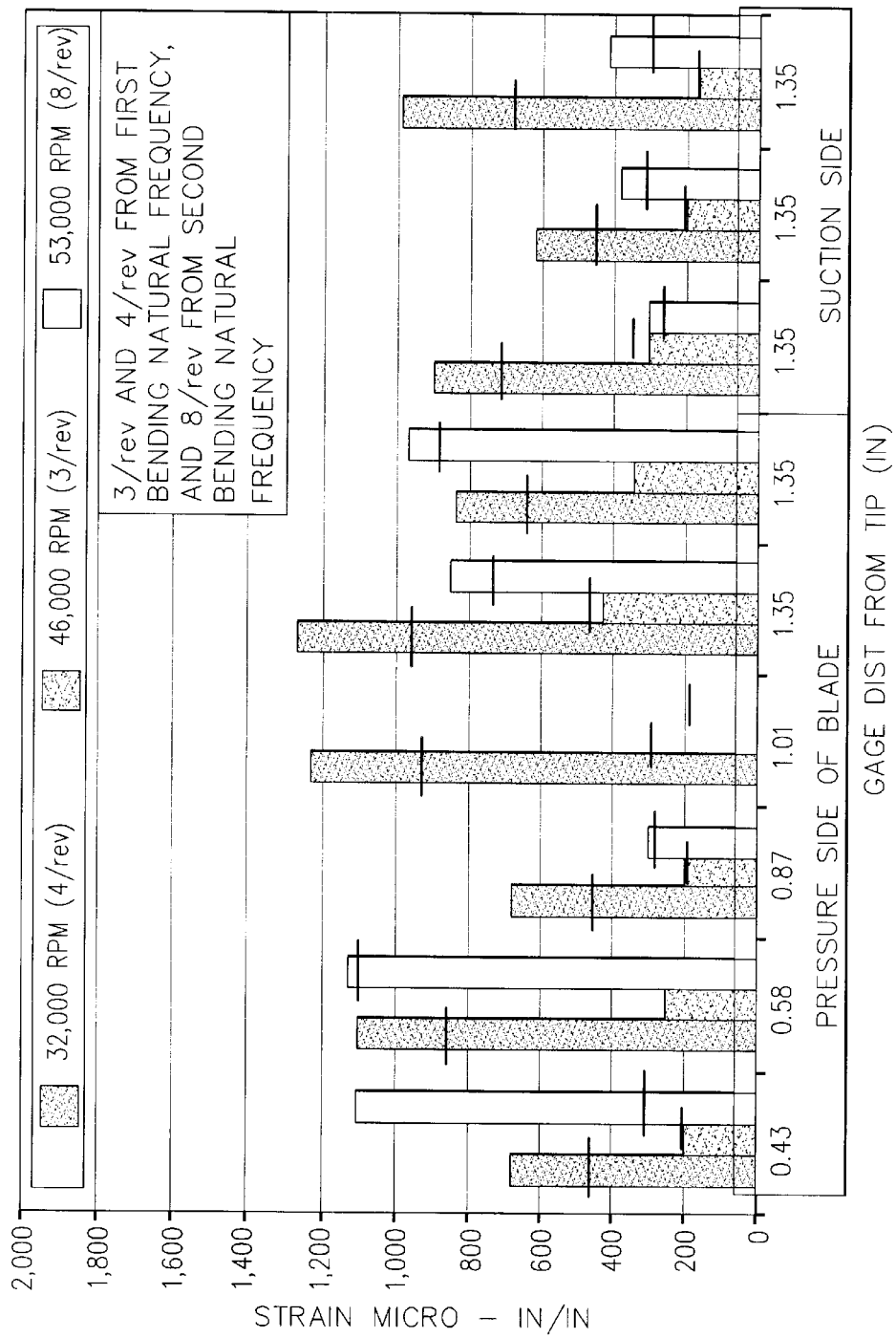
FIG. 5 shows a bar chart of strain gage testing results of fan blades with prior art (i.e., four equally spaced) struts.
Figure 6:
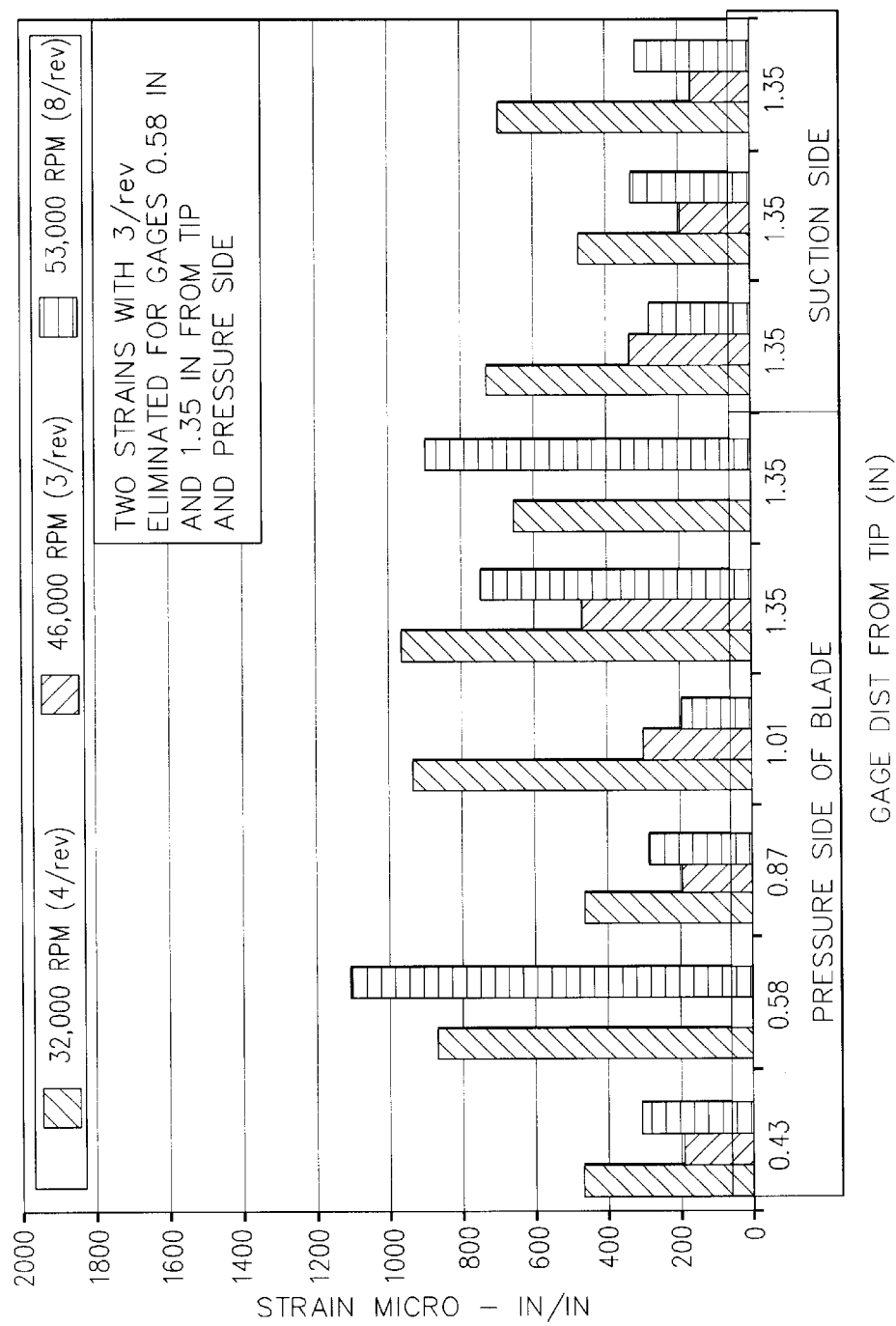
FIG. 6 shows a second bar chart of strain gage testing results of fan blades with three unequally spaced struts.

Referring now to FIG. 5, a bar chart depicting a set of strain gage test results of the rotor blades 10a is shown. The strain gage test tests the strain placed on the blades during operation. During the strain gage test, strain gages are judiciously placed at various locations on the fan blades and the readings are taken at different operational speeds. The strain gage test results of FIG. 5 show the strain exerted on the rotor blades while operating at three speeds, 32,000 rpm, 46,000 rpm and 53,000 rpm, at various locations on the blade, on both the pressure side and suction side of the rotor blades 10a. The solid bars reflect the strain levels of the rotor blades during operation when the struts are equally spaced such as struts 30a, 30b, 30c and 30d. Referring now to FIG. 6, a bar chart depicting the results of a strain gage test of the rotor blades 10a is shown when the struts are unequally spaced struts in accordance with the present invention. The bars of FIG. 6 show the reduced or eliminated strain levels that are associated with the unequally spaced struts while the rotor blades operate at three speeds, 32,000 rpm, 46,000 rpm and 53,000 rpm. As shown in FIG. 6 the measured alternating strain may be reduced by up to approximately 30% when the struts are unequally positioned on the second inner wall 23 in accordance with the present invention. The unequally spaced struts may reduce or eliminate the occurrence of low excitation order wakes and accordingly reduce the strain associated with the rotor blades.

It should be understood, of course, that the foregoing relates to preferred embodiments of the invention and that modifications may be made without departing from the spirit and scope of the invention as set forth in the following claims.

We claim:

1. A method of strut placement in relation to a fan assembly, comprising
    positioning a strut arrangement in a cylindrical air passage upstream from the fan assembly, where the strut arrangement includes at least three struts;
    placing the at least three struts along the circumference of the air passage; and
    separating the at least three struts by unequal angles of separation, wherein a selected angle of separation is 360° minus the sum of the remaining angles of separation, and the magnitude of each remaining angle of separation is a prime number.

2. The method of claim 1, further comprising the steps of:
    operating the fan assembly which causes the passage of air through the air passage;
    reducing the occurrence of low order excitation wakes during the operation of the fan assembly; and
    reducing any strain upon the fan assembly.

3. The method of claim 1, further comprising the steps of:
    operating the fan assembly which causes the passage of air through the air passage;
    eliminating the occurrence of low order excitation wakes during the operation of the fan assembly; and
    reducing any strain upon the fan assembly.

4. A system for an air cycle machine, comprising:
    a fan assembly;
    a strut arrangement, where the strut arrangement includes at least three struts, the strut arrangement is positioned upstream from the fan assembly; and
    a cylindrical air passage, wherein the strut arrangement lies within the air passage and the at least three struts are separated by unequal angles of separation along the circumference of the air passage, wherein a selected angle of separation is 360° minus the sum of the remaining angles of separation, and the magnitude of each remaining angle of separation is a prime number.

5. The system of claim 4, where the strut arrangement reduces the occurrence of low order excitation wakes during the operation of the fan assembly and reduces any strain on the fan assembly.

6. The system of claim 4, where the strut arrangement eliminates the occurrence of low order excitation wakes during the operation of the fan assembly and reduces any strain on the fan assembly.

7. A strut arrangement for an air cycle machine, comprising:
    a cylindrical air passage; and
    at least three struts positioned along the circumference of the air passage upstream from a fan assembly, wherein the at least three struts are separated by unequal angles of separation, wherein a selected angle of separation is 360° minus the sum of the remaining angles of separation, and the magnitude of each remaining angle of separation is a prime number.

8. The strut arrangement of claim 7, where the strut arrangement reduces the occurrence of low order excitation wakes during the operation of the fan assembly and reduces any strain on the fan assembly.

9. The strut arrangement of claim 7, where the strut arrangement eliminates the occurrence of low order excitation wakes during the operation of the fan assembly and reduces any strain on the fan assembly.

10. A method of strut placement in relation to a fan assembly, comprising:
    positioning a strut arrangement in a cylindrical air passage upstream from the fan assembly, where the strut arrangement includes three struts;
    placing the three struts along the circumference of the air passage; and
    separating the three struts by three unequal angles of separation, wherein a selected angle of separation is 360° minus the sum of the remaining angles of separation, and the magnitude of each remaining angle of separation is a prime number.

11. The method of strut placement of claim 10, wherein the selected angle of separation is 150° and the remaining angles are 127° and 83°.

12. The method of strut placement of claim 10, wherein the selected angle of separation is 126° and the remaining angles are 103° and 131°.

13. The method of strut placement of claim 10, further comprising the steps of:
    operating the fan assembly which causes the passage of air through the air passage;
    reducing the occurrence low order excitation wakes during the operation of the fan assembly; and
    reducing any strain upon the fan assembly.

14. The method of strut placement of claim 10, further comprising the steps of:
    operating the fan assembly which causes the passage of air through the air passage;
    eliminating the occurrence of low order excitation wakes during the operation of the fan assembly; and
    reducing any strain upon the fan assembly.

15. A system for an air cycle machine, comprising:
    a fan assembly;
    a strut arrangement, where the strut arrangement includes three struts, the strut arrangement is positioned upstream from the fan assembly; and
    a cylindrical air passage, wherein the strut arrangement lies within the air passage and the three struts are separated by unequal angles of separation along the circumference of the air passage, wherein a selected angle of separation is 360° minus the sum of the remaining angles of separation, and the magnitude of each remaining angle of separation is a prime number.

16. The system of claim 15, wherein the selected angle of separation is 150° and the remaining angles are 127° and 83°.

17. The system of claim 15, wherein the selected angle of separation is 126° and the remaining angles are 103° and 131°.

18. The system of claim 15, where the strut arrangement reduces the occurrence of low order excitation wakes during the operation of the fan assembly and reduces any strain on the fan assembly.

19. The system of claim 15, where the strut arrangement eliminates the occurrence of low order excitation wakes during the operation of the fan assembly and reduces any strain on the fan assembly.

20. A strut arrangement for an air cycle machine, comprising:

a cylindrical air passage; and three struts positioned along the circumference of the air passage upstream from a fan assembly, wherein the three struts are separated by unequal angles of separation, a selected angle of separation being 360° minus the sum of the remaining angles of separation, and the magnitude of each remaining angle of separation is a prime number.

21. The strut arrangement of claim 20, wherein the selected angle of separation is 150° and the remaining angles are 127° and 83°.

22. The strut arrangement of claim 20, wherein the selected angle of separation is 126° and the remaining angles are 103° and 131°.

23. The strut arrangement of claim 20, where the strut arrangement reduces the occurrence of low order excitation wakes during the operation of the fan assembly and reduces any strain on the fan assembly.

24. The strut arrangement of claim 20, where the strut arrangement eliminates the occurrence of low order excitation wakes during the operation of the fan assembly and reduces any strain on the fan assembly.

\* \* \* \* \*